(12) United States Patent
Ayano et al.

(10) Patent No.: US 6,525,510 B1
(45) Date of Patent: Feb. 25, 2003

(54) VEHICLE OPERATING SYSTEM

(75) Inventors: Hideki Ayano, Hitachi (JP); Hiromi Inaba, Hitachinaka (JP); Ikuo Yamato, Hitachi (JP); Kouki Yamamoto, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/101,311

(22) Filed: Mar. 20, 2002

(30) Foreign Application Priority Data

Aug. 8, 2001 (JP) ..................................... 2001-241234

(51) Int. Cl.$^7$ .................................................. H02J 7/00
(52) U.S. Cl. ...................................... 320/109; 320/108
(58) Field of Search ................................. 320/109, 108, 320/107, 104; 439/248, 249; 336/DIG. 2, 66; 180/65.1

(56) References Cited

U.S. PATENT DOCUMENTS

| | | | |
|---|---|---|---|
| 5,612,606 A | * 3/1997 | Guimarin et al. | 320/109 |
| 5,646,500 A | * 7/1997 | Wilson | 320/108 |
| 5,680,028 A | * 10/1997 | McEachern | 320/108 |
| 5,703,461 A | * 12/1997 | Minoshima et al. | 320/108 |
| 6,157,162 A | * 12/2000 | Hayashi et al. | 320/104 |

FOREIGN PATENT DOCUMENTS

| | | |
|---|---|---|
| JP | A-63-87136 | 4/1988 |
| JP | U-1-79343 | 5/1989 |
| JP | A-2000-051419 | 2/2000 |

\* cited by examiner

*Primary Examiner*—Edward H. Tso
*Assistant Examiner*—Lawrence Luk
(74) *Attorney, Agent, or Firm*—Crowell & Moring LLP

(57) ABSTRACT

There is provided a vehicle operating system constituted of a vehicle and at least a charging apparatus, the system comprising means for enabling high-precision unmanned positioning, despite primarily vertical displacements of the vehicle due to changes in tire pressure or weight of a passenger or passengers, and hence enabling efficient, stable power feeding. The charging apparatus includes a power feeding unit, and a vehicle includes a power receiving unit for feeding power in a noncontact manner, which makes possible recharging without manual assistance. A C-shaped transformer and an I-shaped transformer are used for the power feeding unit and the power receiving unit, respectively, so that a magnetic flux induced therebetween can develop substantially in the horizontal direction, thereby feeding power stably despite changes in tire pressure and the like. Tire guides for guiding the vehicle to a power feeding position and a car stop are so used that when the vehicle 1 comes in contact with the car stop, the power feeding unit and the power receiving unit will face each other in a correct position, thus enabling high-precision positioning at power feeding time.

16 Claims, 11 Drawing Sheets

VEHICLE OPERATING SYSTEM

BACKGROUND OF THE INVENTION

1. Field of the Invention

The present invention relates to a vehicle operating system, and more particularly, to means for enabling efficient, stable power feeding for a vehicle regardless of the presence or absence of primarily vertical displacements of the vehicle.

2. Related Art

In the specification, the vehicle operating system means a vehicle, such as a golf cart, an electric car, an electric-powered wheelchair, a truck, an automated guided vehicle and a robot, and a parking facility including means for supplying energy to the vehicle.

Of all the vehicles, a motorized cart has been used as the conventional golf cart. The motorized golf cart, however, has had such problems that noise and exhaust emissions make its performance very bad from the environmental standpoint, and that they are offensive to users.

To solve these problems, JP-A-2000-51419 (prior art 1) discloses a battery-equipped golf cart, for example. The electric golf cart using a battery is environmentally friendly because of no noise and exhaust emissions. The prior art 1 teaches that the battery is contained in the lower part of a front seat, which makes it easy to replace the battery.

Several examples of electric vehicles have also reported in the area of electric cars. In particular, conventional examples of unmanned feeding techniques are described in JP-A-63-87136 (prior art 2) and JP-U-1-79343 (prior art 3).

An automobile charging apparatus of the prior art 2 includes electromagnetic coils provided in a vehicle and on the ground, and means for detecting that both coils face each other in a correct position.

In the prior art 3, grooves for guiding tires of a vehicle are formed on the ground and a vehicle approach detecting switch is so provided that battery charging will start when the vehicle reaches a predetermined position.

In the prior art 1, when the battery goes weak, the battery needs to be manually replaced. Especially, since many golf courses have plural golf carts, battery replacement puts increases loads on workers.

In the case that a golf course is adopting a self-service system in which users or players are required to connect an electric golf cart to the receptacle of a battery charging apparatus after each use instead of battery replacement, the users may find it troublesome to do so, or if a charging station is located in the open air, there is a danger that the users receive an electric shock due to rain or their sweats.

In the case that the electromagnetic coils or transformers are placed in the vehicle and on the ground as disclosed in the prior art 2, a magnetic flux transmitted between the coils develops in the vertical direction. In such a form of non-contact power feeding, charging characteristics largely vary depending on the width of a gap between the coils. In other words, the larger the width of the gap, the smaller the excitation inductance between the coils, which results in an increase in leakage inductance. On the other hand, the smaller the width of the gap, the larger the excitation inductance between the coils, which results in a decrease in leakage inductance.

Variations in excitation inductance between the coils may bring about fears of adverse effects such as frequency fluctuations in charging current. If the frequency is too low, the transformers may cause magnetic saturation, while if the frequency is too high, sufficient control of the charger may be impossible.

In the case that a magnetic flux transmitted develops in the vertical direction as in the prior art 2, the gap width changes according to the tire pressure or the weight of baggage loaded on the vehicle, which makes it difficult to recharge the vehicle stably.

It is considered possible that both coils are brought into contact with each other to prevent the occurrence of a gap. Bringing the coils into contact with each other, however, may cause a short circuit or break due to wear by friction or corrosion and therefore require frequent maintenance of the coils.

In the prior art 2, when the vehicle is to be stopped at a predetermined position, the front and rear of the vehicle can be positioned by using a car stop. On the other hand, it is very hard to position the right and left of the vehicle. As a result, positioning of the vehicle has to be repeated until the vehicle is parked in the predetermined position.

In the prior art 3, the grooves for guiding the tires need to be formed on the ground. Therefore, like the golf carts, if one golf course has plural vehicles, a plurality of grooves need to be newly formed, which requires time and costs for the installation or construction.

Further, in the prior art 3, although the right and left of the vehicle can be positioned, it is very hard to position the front and rear of the vehicle.

It is an object of the present invention to provide a vehicle operating system constituted of a vehicle and at least a charging apparatus, the system comprising means for enabling high-precision unmanned positioning despite primarily vertical displacements of the vehicle due to changes in tire pressure and the like, and hence enabling high-efficient, stable power feeding.

SUMMARY OF THE INVENTION

To attain the above object, and according to the present invention, there is provided a vehicle operating system constituted of a parking facility including at least a charging apparatus, and a vehicle possibly displaced primarily in the vertical direction, the vehicle operating system comprising a power feeding unit connected to the charging apparatus and a power receiving unit mounted in the vehicle, in which when the vehicle is stopped at a predetermined position in the parking facility, the power feeding unit and the power receiving unit face each other in a correct position so that a magnetic flux for feeding power by magnetic coupling will develop substantially in the horizontal direction.

The vehicle has tires and/or a suspension system modifiable according to the load.

There are two cases where the power feeding unit has a C-shaped transformer and the power receiving unit has an I-shaped transformer, and where the power feeding unit has an I-shaped transformer and the power receiving unit has a C-shaped transformer.

When the power feeding unit and the power receiving unit face each other in a correct position, the I-shaped transformer is positioned in a gap of the C-shaped transformer.

In either case, when tire guides for guiding the vehicle to a power feeding position and a car stop are provided, the width between the tire guides becomes substantially equal to the tire width, and the car stop is so located that when the vehicle comes in contact with the car stop, the power receiving unit and the power feeding unit will face each other in a correct position.

The vehicle operating system may further comprise a detection device for detecting that the vehicle has come in contact with the car stop and making the power feeding unit start charging.

The width of a gap between the power receiving unit and the power feeding unit is set larger than the width of the tire guides and the tire.

Another configuration is possible in which a pair of tire guides has such a length that a plurality of vehicles can be placed thereon at the same time, and a plurality of power feeding units are provided along the pair of tire guides substantially at such regular intervals that intervehicular contact will never happen.

The vehicle operating means may also comprise communication means for guiding each vehicle to a rechargeable position.

The vehicle may further comprise a mechanism for making part of the power receiving unit project outside of the vehicle in synchronization with a braking mechanism of the vehicle.

According to the present invention, the charging apparatus includes the power feeding unit and the vehicle includes the power receiving unit, so that power is fed in a noncontact manner, thereby charging the vehicle without manual assistance.

Further, since the use of a combination of the C-shaped and I-shaped transformers for the power feeding unit and the power receiving unit enables the magnetic flux to develop substantially in the horizontal direction, high-efficient, stable power feeding becomes possible despite primarily vertical displacements of the vehicle due to changes in tire pressure and the like.

Furthermore, since the tire guides for guiding the vehicle to a charging position and the car stop are so used that when the vehicle comes in contact with the car stop, the power receiving unit and the power feeding unit will face each other in a correct position, high-precision positioning can be realized at power feeding time.

Other objects, features and advantages of the invention will become apparent from the following description of the embodiments of the invention taken in conjunction with the accompanying drawings.

DETAILED DESCRIPTION OF PREFERRED EMBODIMENTS

With reference to FIGS. 1 to 14, vehicle operating systems according to embodiments of the present invention will be described.

(First Embodiment)

Figure 1:
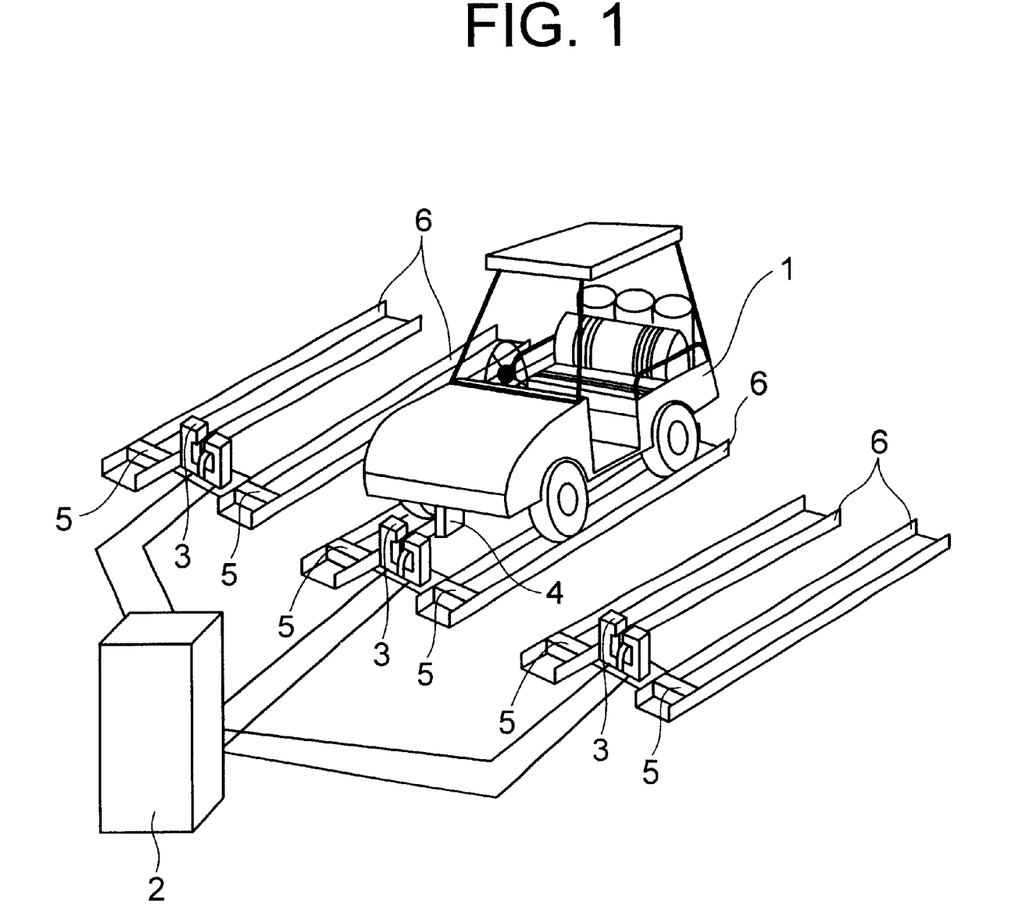
FIG. 1 is a perspective view of a general structure of a vehicle operating system according to a first embodiment of the present invention.

FIG. 1 is a perspective view of a general structure of a vehicle operating system according to the first embodiment of the present invention. The vehicle operating system according to the first embodiment includes a vehicle 1, a charging apparatus 2, a power feeding unit 3 connected to the charging apparatus 2, a power receiving unit 4 mounted in the vehicle 1, a car stop 5 and tire guides 6. In the first embodiment, the vehicle 1 is a golf cart. The power feeding unit 3 and the power receiving unit 4 form transformers for feeding power in noncontact manner using magnetic coupling. The power receiving unit 4 is connected to a battery, not shown, mounted in the vehicle 1.

The vehicle operating system for driving the vehicle 1 by electric energy from the battery like in the first embodiment can reduce noise and prevent the exhaust emissions, compared to the conventional motorized cart using gasoline. Thus the vehicle operating system is environmentally friendly.

Further, the vehicle operating system of FIG. 1 does not involve any manual task such as to use connection tools like receptacles during recharging time, so that loads of workers can be remarkably reduced. Unlike contact type power feeding, since the noncontact form of power feeding to the battery does not cause a short circuit or break due to wear by friction or corrosion, the number of maintenance times can be remarkably reduced as well.

In operation, when the battery of the vehicle 1 runs low on energy, electric energy is supplied to the battery from the charging apparatus 2 through the power feeding unit 3 and the power receiving unit 4. The supply of electric energy to the battery is performed in such a state that the power feeding unit 3 and the power receiving unit 4 face each other in a correct position.

Figure 2:
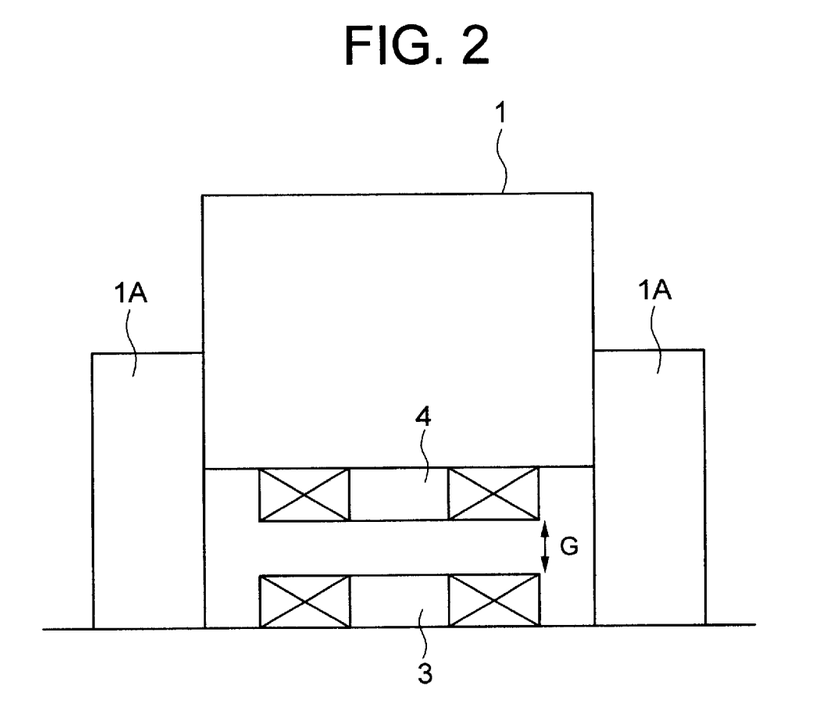
FIG. 2 is a schematic view of a power feeding unit and a power receiving unit in a conventional vehicle operating system.

FIG. 2 is a schematic diagram of a power feeding unit and a power receiving unit in a conventional vehicle operating system. The power feeding unit 3 and the power receiving unit 4 are each formed by an exciting coil. In operation, when the vehicle 1 moves with the movement of tires 1A and reaches a predetermined position, the power receiving unit 4 of the vehicle 1 receives a magnetic flux caused by the power feeding unit 3 to take in the electric energy.

In this conventional structure, the power feeding unit 3 and the power receiving unit 4 face each other in such a correct position that the magnetic flux develops substantially in the vertical direction. For this reason, if a primarily vertical displacement occurs in the vehicle 1 due to a change in tire pressure or loaded weight, a gap width G between transformers will change.

In general, the noncontact form of power feeding tends largely to change charging characteristics according to the gap width G between the power feeding unit 3 and the power receiving unit 4. For example, since a change in the gap width G causes fluctuations in excitation inductance between the coils, a resonance point of impedance determined by the coupling coefficient, the transformers and the load is changed, which makes is difficult to supply electric energy stably.

In the case of the conventional example of FIG. 2, since the gap width G is changed according to the air pressure of the tires 1A or the weight loaded on the vehicle 1, there is a danger of being incapable of stable supply of electric energy.

Figure 3:
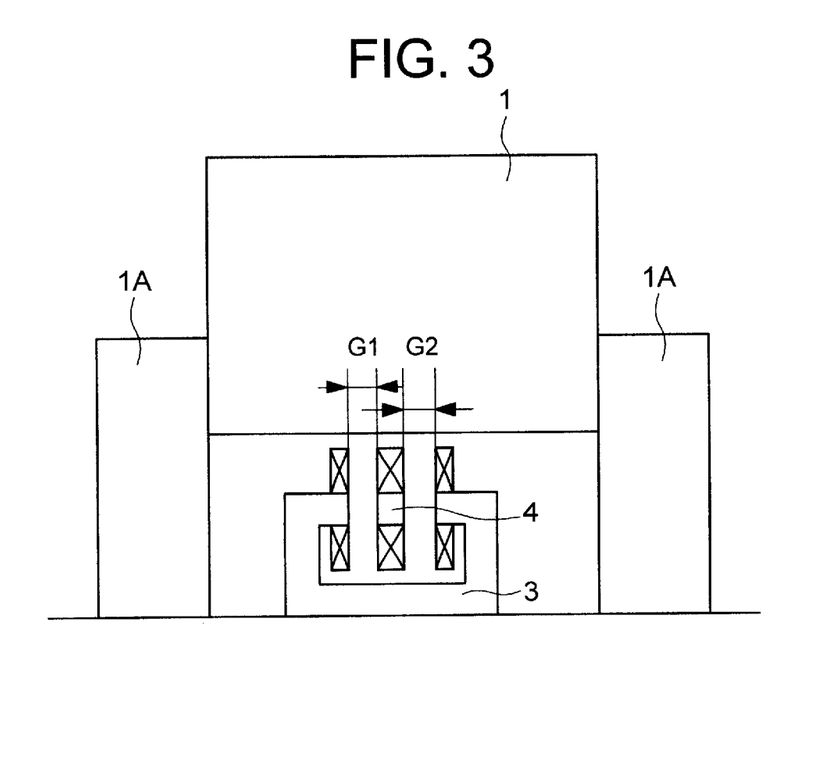
FIG. 3 is a schematic view of a power feeding unit and a power receiving unit in the vehicle operating system according to the present invention.

FIG. 3 is a schematic diagram of the power feeding unit and the power receiving unit in the vehicle operating system according to the present invention. In the first embodiment, a transformer with a C-shaped core is adopted for the power feeding unit 3, while a transformer with an I-shaped core is adopted for the power receiving unit 4. In this structure of the present invention, the power feeding unit 3 and the power receiving unit 4 face each other in such a correct position that the magnetic flux will develop in the horizontal direction at power feeding time. Therefore, even if primarily vertical displacements occur in the vehicle 1, since the gap width G1+G2 between the transformers is kept constant, extremely stable power feeding becomes possible.

It should be noted that the C-shaped core does not necessarily draw a smooth curve like letter C of the alphabet. It may be integrally molded into a square shape, or linear cores may be bonded to form the C-shaped core. If the core is formed by bonding linear cores, the bonded portions could cause losses. The losses in the bonded portions, however, present almost no problem because losses resulting from the gap between the transformers are much more dominant.

Figure 4:
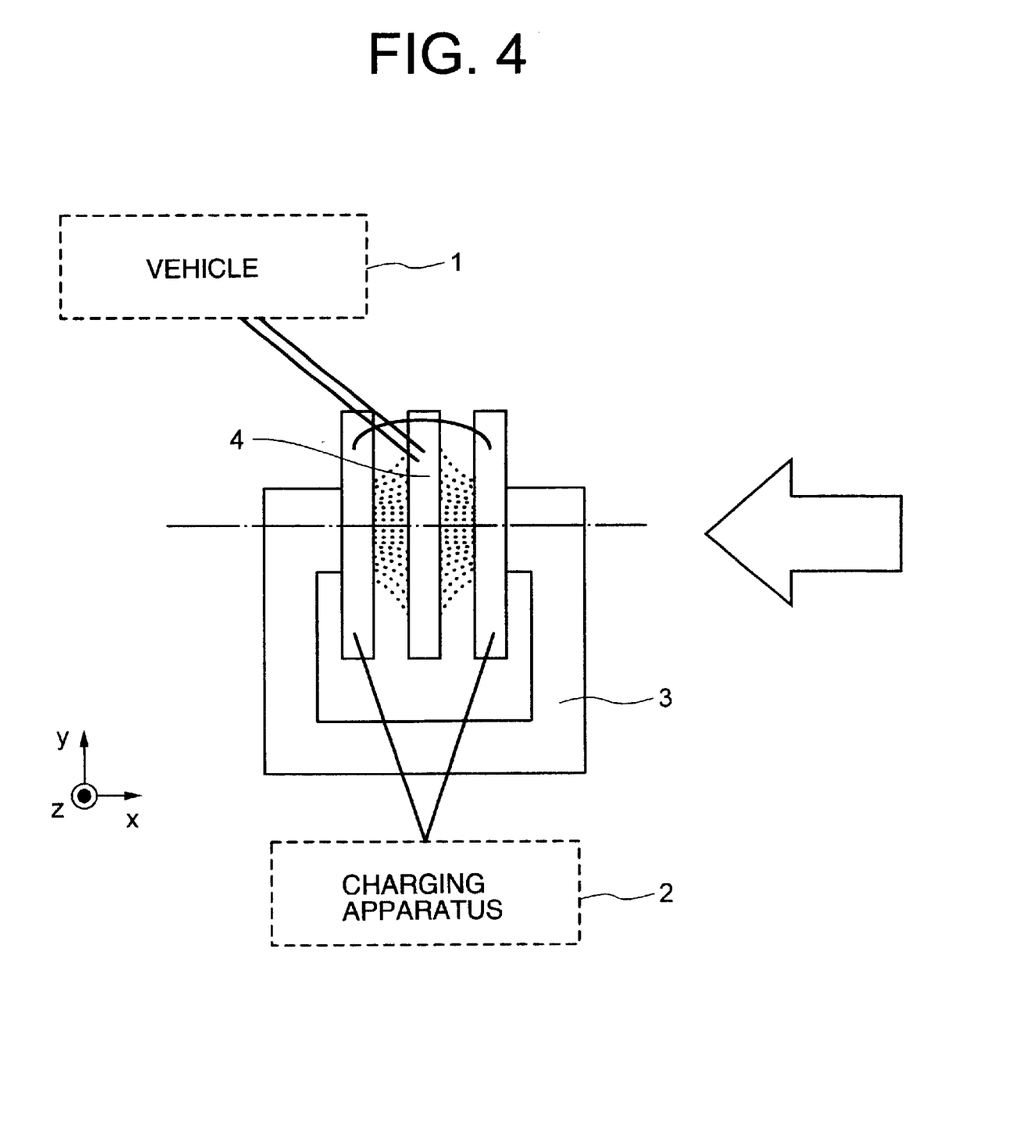
FIG. 4 is an enlarged view of a power feeding transformer according to the first embodiment of the present invention.
Figure 5A:
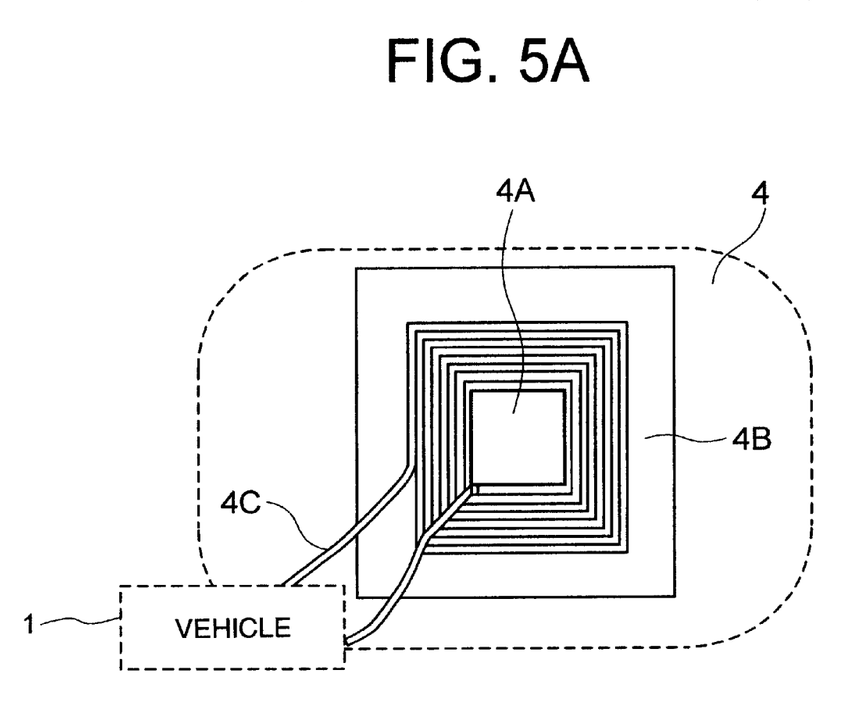
FIG. 5A is a sectional view of the primary winding of the power feeding transformer according to the first embodiment of the present invention, as seen from the direction of arrow in FIG. 4.
Figure 5B:
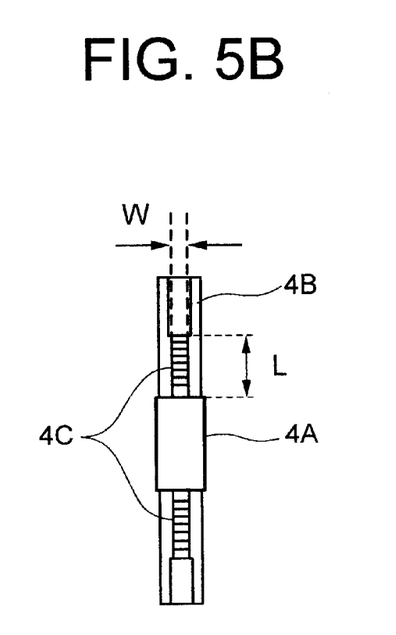
FIG. 5B is a sectional view of the primary winding of the power feeding transformer as seen from the vertical direction of FIG. 4.

Referring next to FIGS. 4, 5A and 5B, the C-shaped and I-shaped transformers will be described in more detail. FIG. 4 is an enlarged view of the power feeding transformer according to the first embodiment of the present invention. FIGS. 5A and 5B are views of the primary winding of the power feeding transformer according to the first embodiment of the present invention.

In FIG. 4, the z-axis faces in the direction perpendicular to the paper surface, and the magnetic flux distribution is also indicated on the space with dotted lines.

FIG. 5A is a sectional view of the I-shaped transformer 4 as seen from the direction of arrow in FIG. 4. The I-shaped transformer 4 consists of a core 4A and a coil 4B which contains a coil winding 4C. FIG. 5B is a sectional view of the I-shaped transformer 4 as seen from the direction perpendicular to the paper surface of FIG. 4. As shown in FIG. 5A, turns of the coil winding 4C are overlapped one upon another with both ends of the winding connected to the vehicle 1. Further, as shown in FIG. 5B, a length L in the overlapped direction is set longer than a coil width W, that is, the coil winding 4C is wound in a spiral shape. The reason for winding it spirally will be described later in detail.

The coil of the C-shaped transformer shown in FIG. 4 is also wound in a spiral shape with both ends connected to the charging apparatus. The coil 4B may be formed by molding the coil winding 4C from a resin or the like, or by winding the coil winding 4C around a coil form.

In the first embodiment, the power receiving unit 4 (I-shaped transformer) is mounted in the vehicle 1, aiming at feeding power without manual assistance. Therefore, a relatively large gap between the power feeding unit 3 (C-shaped transformer) and the power receiving unit 4 (I-shaped transformer) needs ensuring. In this regard, the configuration of the transformers is largely different from that of common transformers.

In general, the larger the gap width, the more the leakage flux increases, which results in a reduced coupling ratio of the transformers, that is, a reduced power conveyance efficiency. For this, the width of a gap between common transformers is usually much smaller than the length of a magnetic path.

When a sufficient gap width is required as in the system according to the present invention, the way to reduce the leakage flux becomes important. In FIG. 4, the coil of the power feeding unit 3 (C-shaped transformer) is wound by overlapping turns in parallel with the y-z plane, so that the magnetic flux develops mostly in the direction of the x-axis. The magnetic flux induced is divided into two kinds, namely a magnetic flux that passes through the power feeding unit 4 (I-shaped transformer) and a magnetic flux that leaks to the outside. If the amount of the magnetic flux that leaks to the outside is larger than the other, since the power conveyance efficiency is reduced, the capacity of the charging apparatus will have to be increased more than is necessary. In addition, the increased magnetic flux may cause adverse effects such as heating or electromagnetic interference due to electromagnetic induction.

Therefore, it is necessary to minimize the magnetic flux that leaks to the outside. To achieve this, as shown in FIG. 4, the C-shaped transformer and the I-shaped transformer are so arranged that both end portions of both transformers are positioned in line with one another, which can reduce magnetic reluctance and hence a lot of magnetic flux leakage.

The transformers of FIG. 4 also feature the shape of the coils. A typical transformer coil has a large coil width, and is wound around the core as uniformly as possible along the direction of the major-(longer-) axis. Such a typical transformer that the gap width is small is wound uniformly so that the leakage flux can be reduced. Compared to the typical transformer structure, the transformer structure in which the coil is so wound that it partially concentrates in a spiral shape as shown in FIG. 4 would be a bad example.

However, in the case that the gap width is relatively large as in the system according to the present invention, the magnetic flux induced by the C-shaped transformer as shown in the magnetic flux distribution of FIG. 4 tends to spread to the outside before reaching the I-shaped transformer. In this case, when the transformer coil is wound in the spiral shape, the coil portion can absorb even the leakage flux incapable of being picked up by the I-shaped transformer core, thus enhancing the effect of reducing the leakage flux. For example, when the gap width of transformers having a cross-sectional core area of a few hundred square millimeters is set to about 10 millimeters, if the ratio represented by coil overlapping thickness L/coil width W is changed from 0.1 to 1.0, the coupling coefficient will increase 10% or more. Here, the coupling coefficient denotes a ratio of magnetic flux to be transmitted. In other words, an increase in coupling coefficient denotes a reduction in leakage flux.

If the aspect ratio of the coil is set to one or less, since the vertical length of the power receiving unit 4 in FIG. 1 is primarily shortened, the possibility that the vehicle 1 may come in contact with an obstacle during traveling and cause damage to the power receiving unit 4 can be reduced but the coupling ratio will be reduced.

In contrast, in the case that the gap width is large as in the system according to the present invention, if the ratio of the coil overlapping thickness L and the coil width W is made larger than at least one, the effect of improving the coupling ratio will be enhanced. Therefore, even if vertical displacements occur in the structure of FIG. 1, the coil wound spirally can absorb the magnetic flux that tends to leak to the outside, which results in very little flux leakage and hence stable recharging.

In FIG. 1, if the vehicle 1 should fail to stop against the car stop 5, the C-shaped transformer and I-shaped transformer would need to miss each other and prevent damage due to contact with each other. In the first embodiment, the transformers are arranged not to overlap with each other as projected in the direction to the travel of the vehicle 1.

Various modifications can be made to the shape of the transformers within the limits of these conditions. In other words, although in FIG. 4 the power feeding unit 3 is formed into the C shape that is symmetrical with respect to the power receiving unit 4, it may be formed into an asymmetrical shape. Further, it may be a transformer made up by winding the coil only around one end side of the C-shaped core. In this case, the coupling ratio is slightly reduced but the transformer can be easily assembled.

Next, positioning of the vehicle 1 at power feeding time will be described. The present invention aims to feed power without manual assistance. Therefore, the vehicle 1 needs to be precisely guided to a power feeding position.

Figure 6:
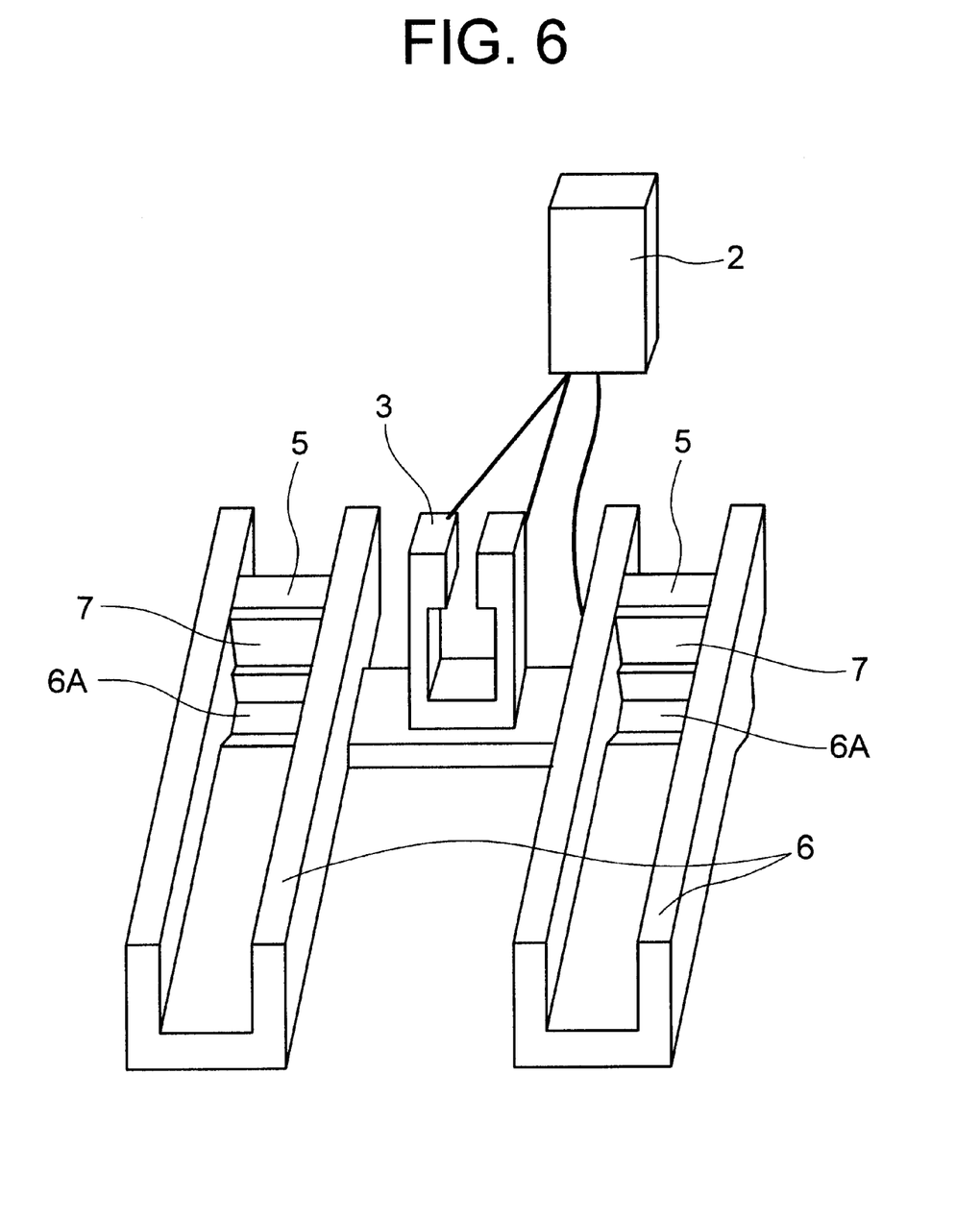
FIG. 6 is a perspective view of the structure of tire guides according to the first embodiment of the present invention.
Figure 7:
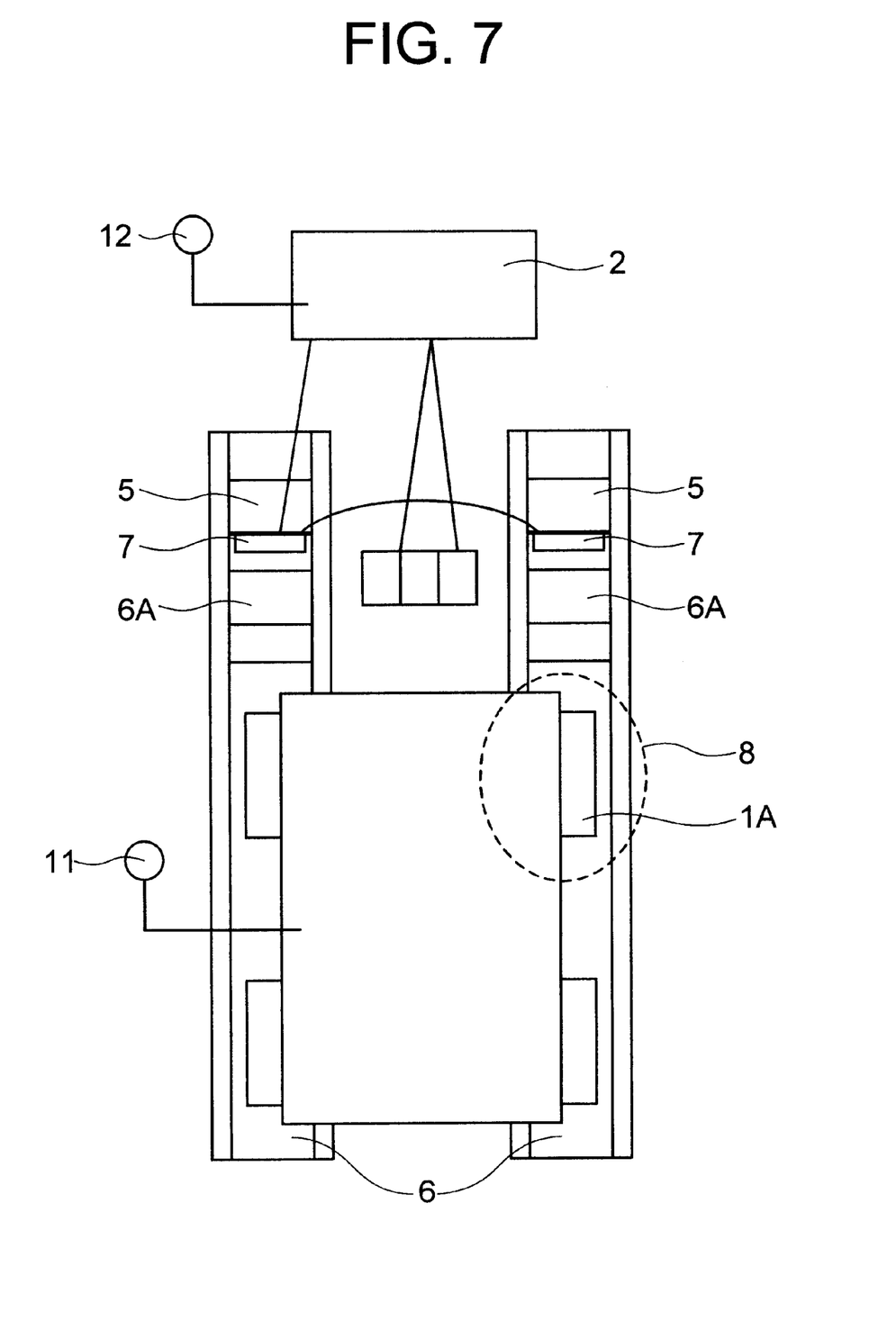
FIG. 7 is a plan view of the tire guides according to the first embodiment of the present invention.
Figure 8:
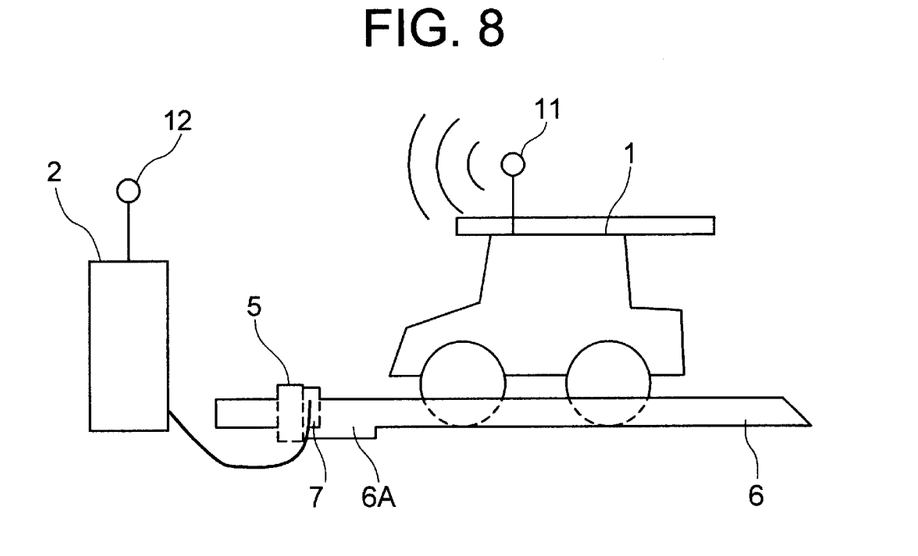
FIG. 8 is a side view of the tire guides according to the first embodiment of the present invention.
Figure 9:
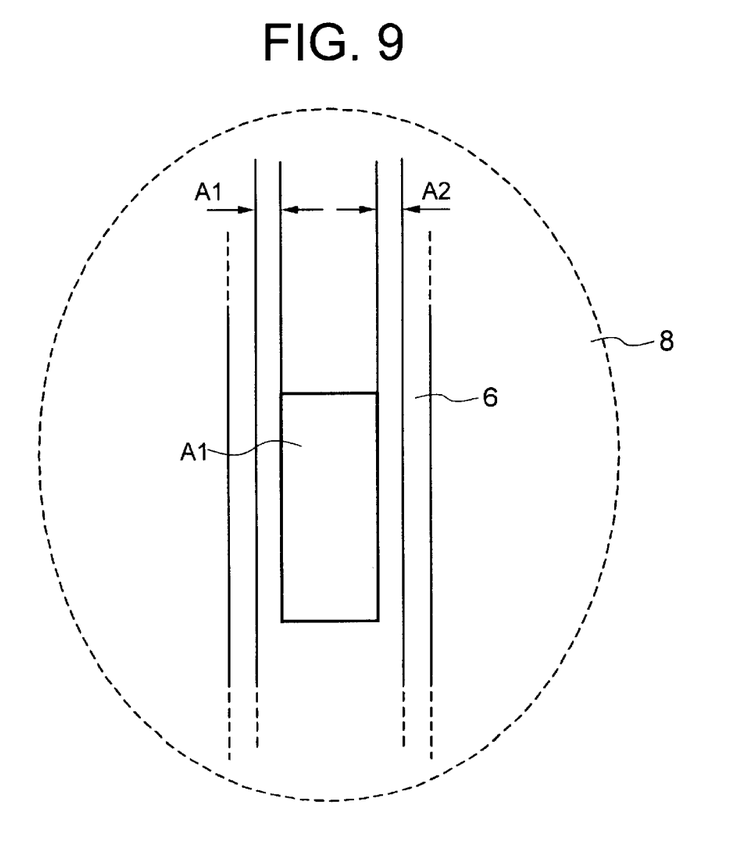
FIG. 9 is a schematic view of the relationship between a tire 1A and a pair of tire guides 6 according to the first embodiment of the present invention.

FIG. 6 is a perspective view showing the structure of tire guides according to the first embodiment of the present invention. FIG. 7 is a plan view of the tire guides according to the first embodiment. FIG. 8 is a side view of the tire guides according to the first embodiment. FIG. 9 is a schematic diagram showing the relationship of a tire 1A and a pair of tire guides 6.

The vehicle 1 travels along the tire guides 6 and stops at a position where the car stop 5 is located. The tire guides 6 of FIG. 6 are so arranged that the power feeding unit 3 and the power receiving unit 4, not shown, will face each other in such a correct position that the vehicle 1 stops against the car stop 5. The car stop 5 positions the front and rear of the vehicle 1. As shown in FIG. 9, if the width of the tire 1A is set substantially equal to the width of the tire guide pair 6, the vehicle 1 can also be positioned in its width direction. In this case, the width of a gap between the power feeding unit 3 and the power receiving unit 4 is set larger than clearance A1+A2 between the tire 1A and the tire guide pair 6.

As shown in FIGS. 6 to 8, a detection device 7 for the vehicle 1 can be used to detect the vehicle 1 so that the charging apparatus 2 will operate based on a detection signal from the detection device 7, thereby achieving automated recharging. Grooves 6A may be further provided for higher positioning accuracy. The grooves 6A not only help the driver to perceive that the vehicle 1 is in the recharging position, but also secure the tire 1A.

Further, as shown in FIGS. 7 and 8, a vehicle-mounted radio 11 and a charger-mounted radio 12 may be used for an unattended operation. In this case, position sensors may be attached to the tire guides 6 or an excitation inductance of the transformer may be detected, which makes it possible to further improve the positioning accuracy. The detection of the excitation inductance is carried out using such a characteristic that the excitation inductance reaches its peak value when the power receiving unit and the power feeding unit come to face each other.

It should be noted that the system according to the first embodiment may be such that one charging apparatus 2 recharges only one vehicle 1 rather than plural vehicles 1.

(Second Embodiment)

Figure 10:
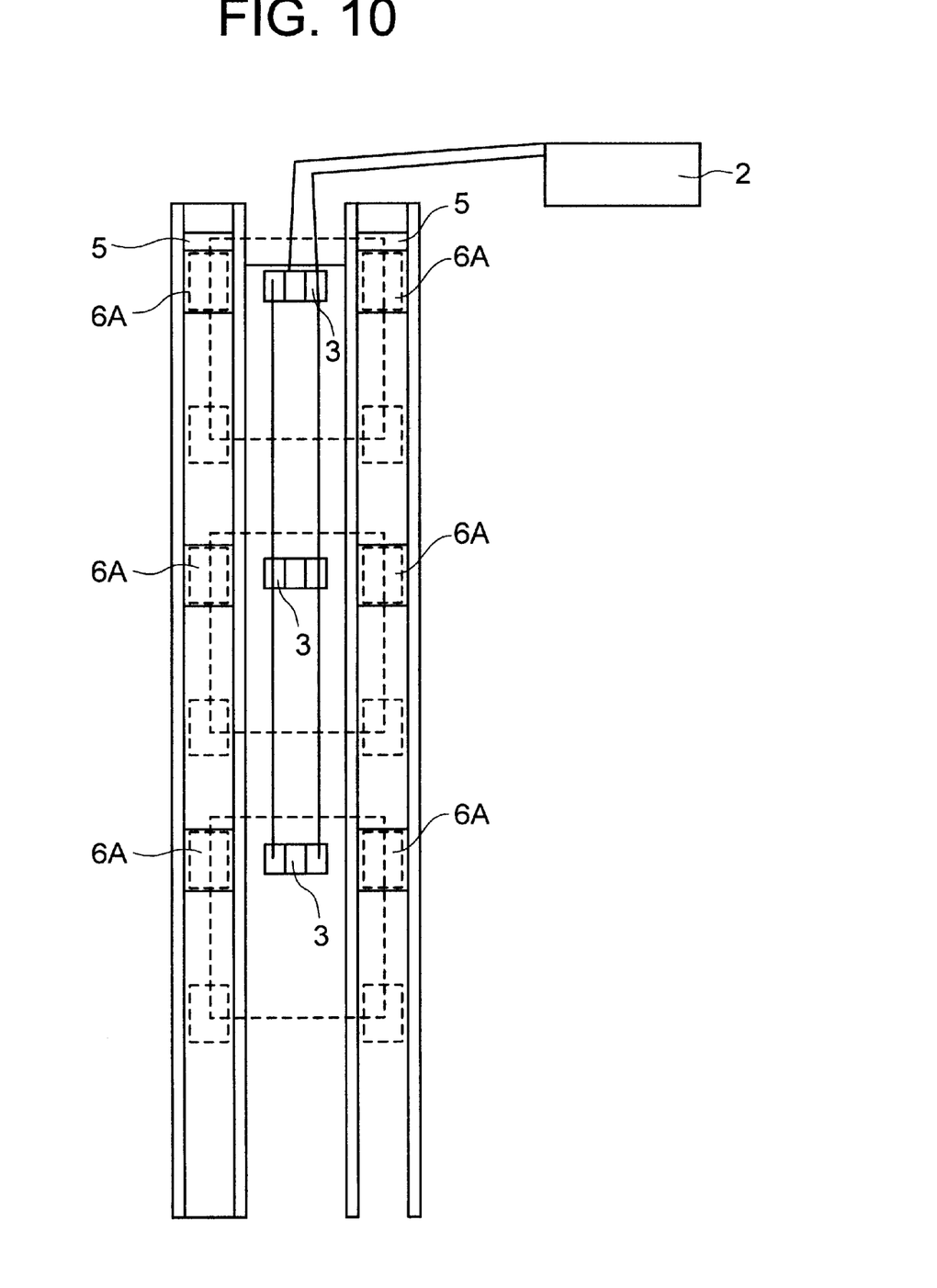
FIG. 10 is a plan view of the arrangement of tire guides in a vehicle operating system according to a second embodiment of the present invention.

FIG. 10 is a plan view of the structure of tire guides in a vehicle operating system according to the second embodiment of the present invention. The second embodiment shows an example of a vehicle operating system in which plural vehicles 1 can be placed on a pair of tire guides at the same time. In this case, plural power feeding units 3 are spaced substantially at such regular intervals that intervehicular contact will never happen. In the second embodiment, plural vehicles 1 are supplied with power or parked, which results in space savings.

(Third Embodiment)

Figure 11:
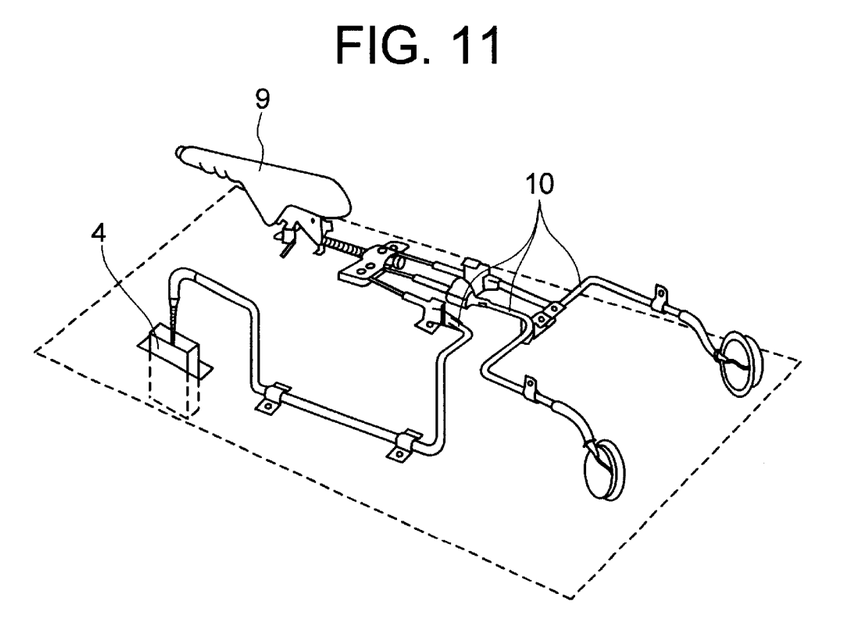
FIG. 11 is a perspective view of the relationship between a braking system and a power receiving unit according to a third embodiment of the present invention.

FIG. 11 is a perspective view showing the relationship between a braking system and the power receiving unit in a vehicle operating system according to the third embodiment of the present invention. In the third embodiment, the power receiving unit 4 is coupled with a break lever 9 of a parking break through a cable 10. When the driver pulls the break lever 9 of the parking break, a wire is pulled and the pulling force travels through cables 10 to lock the tires. In synchronization with this lockup, the power receiving unit 4 moves up and down. In other words, only when the brake level 9 is pulled, the power receiving unit 4 is allowed to project outside of the vehicle 1 and come to an easy-to-feed position.

Since the brake is always applied whenever the driver or user parks the vehicle, application of the brake is no burden on the user. This mechanism can not only minimize the gap width between the power receiving unit and the power feeding unit, but also prevent the power receiving unit 4 from coming in contact with an obstacle during traveling and getting damaged.

This concept is not limited to the mechanism for making the power receiving unit 4 project downward from the body, and it can be applied to another mechanism for making the power receiving unit 4 project upward from the body.

(Fourth Embodiment)

Figure 12:
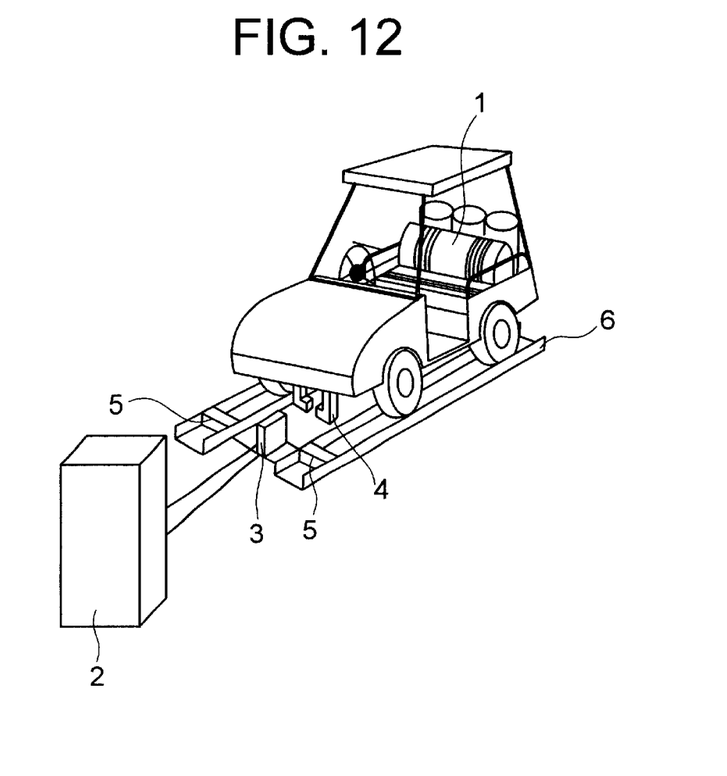
FIG. 12 is a perspective view of the general structure of a vehicle operating system according to a fourth embodiment of the present invention.

FIG. 12 is a perspective view of the general structure of a vehicle operating system according to the fourth embodiment of the present invention. The fourth embodiment uses an I-shaped transformer for the power feeding unit 3 and a C-shaped transformer for the power receiving unit 4.

In the example of FIG. 1, since the I-shaped transformer is used for the power receiving unit, a weight reduction of the vehicle 1 is possible, which reduces the chance that the vehicle 1 may come in contact with an obstacle during traveling.

On the other hand, when power feeding units 3 are to be installed in many places as shown in FIG. 10, the I-shaped transformer small in volume can be installed in each power feeding unit 3 as shown in FIG. 12 to reduce manufacturing and installation costs. Especially, if the vehicle 1 is a golf cart, the power feeding unit 3 may be provided at each hole on the golf course not only to reduce the chance that the battery may go dead, but also to make the battery last longer.

(Fifth Embodiment)

Figure 13:
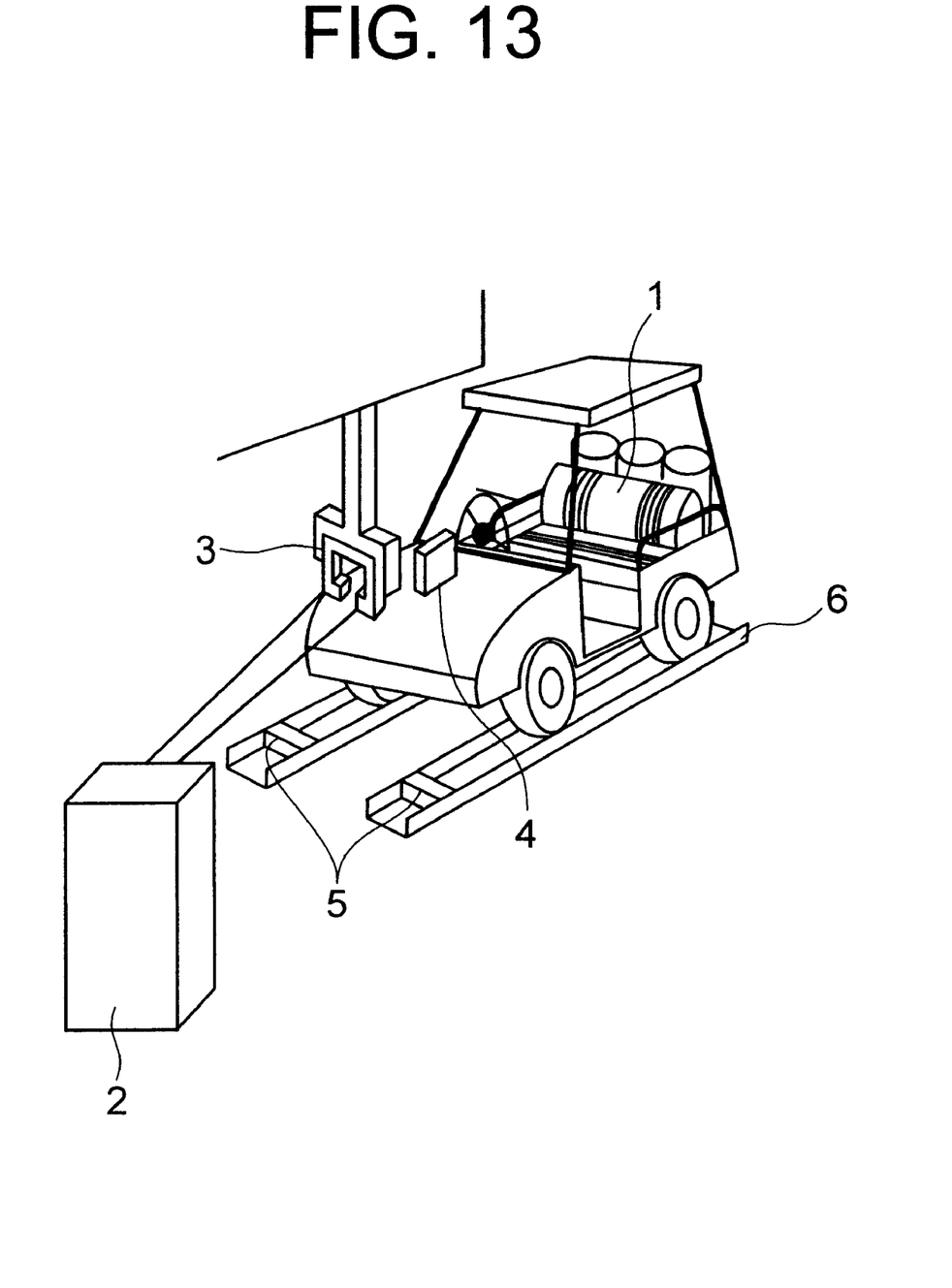
FIG. 13 is a perspective view showing the general structure of a vehicle operating system according to a fifth embodiment of the present invention.

FIG. 13 is a perspective view of the general structure of a vehicle operating system according to the fifth embodiment of the present invention. In the fifth embodiment, the power receiving unit 4 is mounted on the hood. This structure can prevent the power receiving unit 4 from coming in contact with an obstacle during traveling and getting damaged. The operation (operation related to recharging) in which the power feeding unit 3 and the power receiving unit 4 face each other in such a position that the vehicle stops against the car stop 5 and start recharging is carried out in the same manner as in the first embodiment.

As not shown here, the power receiving unit 4 may also be mounted on the roof of the vehicle 1 to prevent damage thereto due to accidental contact.

(Sixth Embodiment)

Figure 14:
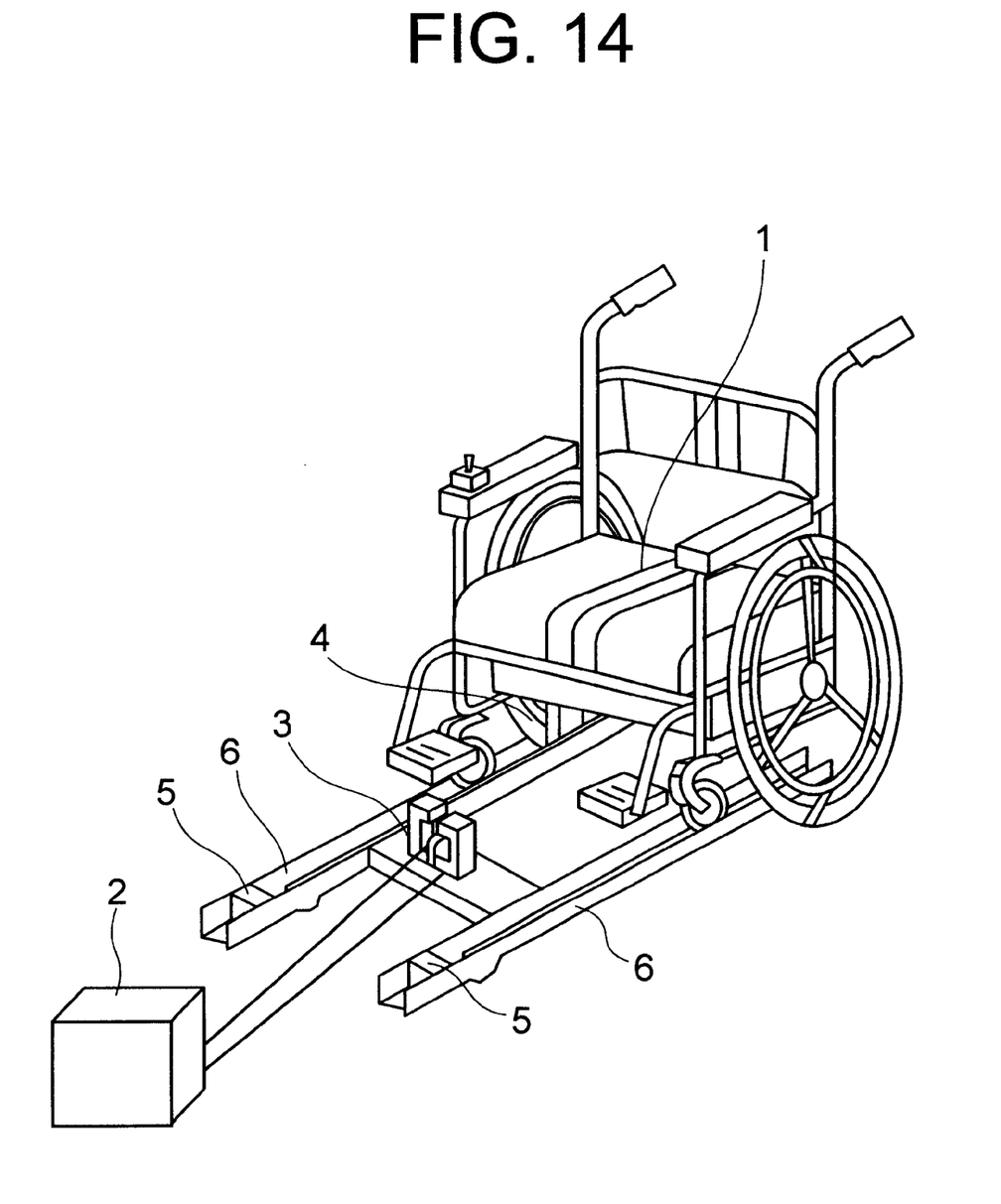
FIG. 14 is a perspective view showing the general structure of a vehicle operating system (an electric-powered wheelchair) according to a sixth embodiment of the present invention.

FIG. 14 is a perspective view of the general structure of a vehicle operating system according to the sixth embodiment of the present invention. In the sixth embodiment, front wheels of a wheelchair are placed on a pair of tire guides 6, but rear wheels may be placed as well. In this case, the operation related to recharging is also carried out in the same manner as in the first embodiment.

The above-mentioned first to sixth embodiments took a golf cart or electric-driven wheelchair as an example of the vehicle, but the present invention is applicable to any other vehicle, such as an electric car, a truck, an automated guided vehicle and a robot, as long as it has a suspension system, such as a traveling system like tires and a suspension, and the power receiving unit 4 is displaceable primarily in the vertical direction.

According to the present invention, in the vehicle operating system constituted of a vehicle and at least a charging apparatus, the charging apparatus includes a power feeding unit and the vehicle includes a power receiving unit for noncontact power feeding, which makes possible recharging without manual assistance.

Further, the use of the C-shaped transformer and the I-shaped transformer for the power feeding unit and the power receiving unit respectively allows the magnetic flux induced therebetween to develop substantially in the horizontal direction, so that efficient, stable power feeding becomes possible despite primarily vertical displacements of the vehicle due to changes in tire pressure and the like.

Furthermore, the use of the tire guides for guiding the vehicle to the power feeding position and the car stop allows the power receiving unit and the power feeding unit to face each other in a correct position when the vehicle comes in contact with the car stop, so that high-precision positioning can be realized at power feeding time.

It should be further understood by those skilled in the art that the foregoing description has been made on embodiments of the invention and that various changes and modifications may be made in the invention without departing from the spirit of the invention and the scope of the appended claims.

What is claimed is:

1. A vehicle operating system including a parking facility including at least a charging apparatus, and a vehicle possibly displaced primarily in the vertical direction, wherein the system comprises a power feeding unit connected to said charging apparatus and a power receiving unit mounted in said vehicle, wherein the system is configured such that, when said vehicle stops at a predetermined position in said parking facility, said power feeding unit and said power receiving unit face each other in a correct position so that a magnetic flux for feeding power by magnetic coupling will develop substantially in a horizontal direction to provide stable power feeding irrespective of changes of displacement of the vehicle in the vertical direction.

2. The vehicle operating system according to claim 1, wherein said vehicle includes tires and/or a suspension system deformable according to a load thereof.

3. The vehicle operating system according to claim 2, wherein said power feeding unit includes a C-shaped transformer and said power receiving unit includes an I-shaped transformer.

4. The vehicle operating system according to claim 2, wherein said power feeding unit includes an I-shaped transformer and said power receiving unit includes a C-shaped transformer.

5. The vehicle operating system according to claim 1, wherein when said power feeding unit and said power receiving unit face each other in a correct position, an I-shaped transformer of said power feeding or receiving unit is positioned in a gap of a C-shaped transformer of said power receiving or feeding unit.

6. The vehicle operating system according to claim 1, further comprising tire guides for guiding said vehicle to a power feeding position and a car stop, said tire guides having a traverse width substantially equal to the width of the tire, and when said vehicle comes in contact with said car stop, said power receiving unit and said power feeding unit facing each other in a correct position.

7. The vehicle operating system according to claim 6, further comprising a detection device for detecting that said vehicle comes in contact with said car stop and making said power feeding unit start recharging.

8. The vehicle operating system according to claim 6, wherein the pair of tire guides has such a length that a plurality vehicles can be placed thereon at the same time, and a plurality of power feeding units are arranged along the pair of tire guides substantially at such regular intervals that intervehicular contact will never happen.

9. The vehicle operating system according to claim 1, wherein said power feeding unit includes an I-shaped transformer and said power receiving unit includes a C-shaped transformer.

10. The vehicle operating system according to claim 1, further comprising communication means for guiding each vehicle to a rechargeable position.

11. The vehicle operating system according to claim 1, further comprising a mechanism for making at least part of said power receiving unit mounted in said vehicle project outside of said vehicle in synchronization with a braking mechanism of said vehicle.

12. The vehicle operating system according to claim 1, wherein said power feeding unit includes a C-shaped transformer and said power receiving unit includes an I-shaped transformer.

13. The vehicle operating system according to claim 1, wherein at least one of said power feeding and said power receiving units is a transformer having coil winding overlapped one upon another and spirally wound.

14. The vehicle operating system according to claim 1, further comprising a tire guide apparatus for guiding said vehicle to a desired power feeding position and a car stop having a fixed stopper for positioning the vehicle in a width direction thereof.

15. A vehicle operating system including a parking facility including at least a charging apparatus, and a vehicle possibly displaced primarily in the vertical direction, wherein the system comprises     a power feeding unit connected to said charging apparatus and a power receiving unit mounted in said vehicle, wherein the system is configured such that,     when said vehicle stops at a predetermined position in said parking facility, said power feeding unit and said power receiving unit face each other in a correct position so that a magnetic flux for feeding power by magnetic coupling will develop substantially in a horizontal direction to provide stable power feeding irrespective of changes of displacement of the vehicle in the vertical direction, and further comprising         tire guides for guiding said vehicle to a power feeding position and a car stop,         said tire guides having a traverse width substantially equal to the width of the tire, such that,         when said vehicle comes in contact with said car stop, said power receiving unit and said power feeding unit face each other in a desired position,     wherein the width of a gap between said power receiving unit and said power feeding unit is larger than the width of said tire guides and the tire.

16. A vehicle operating system, including a parking facility including at least a charging apparatus, and a vehicle possibly displaced primarily in the vertical direction, wherein the system comprises     a power feeding unit connected to said charging apparatus and a power receiving unit mounted in said vehicle, wherein the system is configured such that,     when said vehicle stops at a predetermined position in said parking facility, said power feeding unit and said power receiving unit face each other in a correct position so that a magnetic flux for feeding power by magnetic coupling will develop substantially in a horizontal direction to provide stable power feeding irrespective of changes of displacement of the vehicle in the vertical direction, and further comprising         tire guides for guiding said vehicle to a power feeding position and a car stop,         said tire guides having a traverse width substantially equal to the width of the tire, such that,         when said vehicle comes in contact with said car stop, said power receiving unit and said power feeding unit face each other in a desired position, and         a detection device for detecting that said vehicle comes in contact with said car stop and making said power feeding unit start recharging,     wherein the width of a gap between said power receiving unit and said power feeding unit is larger than the width of said tire guides and the tire.

\* \* \* \* \*